(12) United States Patent
Holland et al.

(10) Patent No.: US 7,981,519 B2
(45) Date of Patent: Jul. 19, 2011

(54) METALLIC DOUBLER FOR REPAIR OF A GAS TURBINE ENGINE PART

(75) Inventors: Brian K. Holland, Lansing, MI (US); William F. Bogue, Hebron, CT (US); Ron I. Prihar, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 602 days.

(21) Appl. No.: 12/082,455

(22) Filed: Apr. 11, 2008

(65) Prior Publication Data

US 2009/0258185 A1 Oct. 15, 2009

(51) Int. Cl.
*B29C 73/06* (2006.01)
*B29C 73/10* (2006.01)
*B32B 3/12* (2006.01)
*B23P 6/00* (2006.01)

(52) U.S. Cl. .......... 428/593; 428/116; 29/402.11; 29/897.1

(58) Field of Classification Search .......... None
See application file for complete search history.

(56) References Cited

U.S. PATENT DOCUMENTS

| | | | |
|---|---|---|---|
| 4,013,210 A * | 3/1977 | Deminet | 228/106 |
| 4,030,849 A * | 6/1977 | Keifert et al. | 403/272 |
| 4,073,427 A * | 2/1978 | Keifert et al. | 228/165 |
| 4,273,818 A * | 6/1981 | Buchs | 428/116 |
| 4,460,420 A * | 7/1984 | Estrada | 156/64 |
| 4,517,038 A | 5/1985 | Miller | |
| 4,855,182 A * | 8/1989 | Ondrejas et al. | 428/343 |
| 5,023,987 A | 6/1991 | Wuepper et al. | |
| 5,251,435 A | 10/1993 | Pauley | |
| 5,653,836 A | 8/1997 | Mnich et al. | |
| 5,807,628 A | 9/1998 | Mnich et al. | |
| 6,051,302 A | 4/2000 | Moore | |
| 6,210,773 B1 | 4/2001 | Moore | |
| 6,820,334 B2 | 11/2004 | Kebbede et al. | |

(Continued)

FOREIGN PATENT DOCUMENTS

EP 1870228 12/2007

(Continued)

OTHER PUBLICATIONS

Raymond F. Wegman, Handbook of Adhesive Bonded Structural Repair, 1992, pp. 149-159.

(Continued)

*Primary Examiner* — John J Zimmerman
(74) *Attorney, Agent, or Firm* — Kinney & Lange, P.A.

(57) ABSTRACT

A method and system of repairing an engine part having a cracked metal skin bonded to a honeycomb core includes removing a portion of the honeycomb that corresponds to a cracked portion of the metal skin. A crack in the metal skin originates from an edge of the engine part. A portion of the honeycomb is removed to form a slot in the honeycomb beginning at the edge of the part. A doubler is inserted into the slot in the honeycomb and is attached to an underside of the metal skin to form a lap joint between the doubler and the metal skin. In one embodiment, the portion of the metal skin that includes the crack remains. In an alternative embodiment, the cracked portion of the metal skin is removed and a metal patch is attached to the doubler such that the patch replaces the removed metal skin.

20 Claims, 6 Drawing Sheets

U.S. PATENT DOCUMENTS

| | | | |
|---|---|---|---|
| 7,069,830 B1 * | 7/2006 | Meyer | 83/13 |
| 2004/0028877 A1 * | 2/2004 | Itoh et al. | 428/118 |
| 2006/0254661 A1 | 11/2006 | Vintilescu et al. | |
| 2007/0240819 A1 | 10/2007 | Bogue et al. | |
| 2007/0275211 A1 | 11/2007 | Bogue | |
| 2007/0275212 A1 | 11/2007 | Stadtlander et al. | |
| 2007/0289692 A1 | 12/2007 | Bogue et al. | |
| 2008/0047121 A1 * | 2/2008 | Douglas | 29/402.01 |

FOREIGN PATENT DOCUMENTS

| | | | |
|---|---|---|---|
| JP | 06-126869 | * | 5/1994 |
| JP | 08-169057 | * | 7/1996 |
| JP | 08-175498 | * | 7/1996 |
| JP | 09-001263 | * | 1/1997 |

OTHER PUBLICATIONS

Tom Bitzer, Honeycomb Technology—Materials, Design, Manufacturing, Applications and Testing, 1997, pp. 193-199, Fig. 9.4.

Hexcel Composites, Composite Repair, Apr. 1, 1999, pp. 1-13, Figs. 4-6.

Ed A A Baker, Donald H. Middleton, Repair Techniques for Composite Structures, Composite Materials in Aircraft Structures, Jan. 1, 1990, pp. 207-227, Figs. 13.2, 13.4.

EP Search Report and Written Opinion, Aug. 11, 2009, pp. 1-9.

* cited by examiner

… (1)

METALLIC DOUBLER FOR REPAIR OF A GAS TURBINE ENGINE PART

BACKGROUND

The present invention relates to repairing a damaged metal skin of a gas turbine engine part. More particularly, the present invention relates to repairing a cracked metal skin of the engine part by bonding a metal doubler to an underside of the metal skin.

A thin metal layer, such as an aluminum sheet, may be used as an outer skin for a part of a gas turbine engine. The engine part may be formed of a honeycomb core sandwiched between and bonded to two metal skins. The first metal skin may be referred to as a face skin and commonly includes holes or perforations that extend through a thickness of the face skin to the honeycomb. The perforations are provided, in part, for acoustic performance. The second metal skin may be referred to as a back skin and is commonly a non-perforated metal sheet.

The metal parts in the engine may be prone to developing cracks over time. In particular, cracks may form at an edge of a part, starting in the back skin and/or the face skin, due to stress concentrations. A damaged metal skin may be commonly repaired by attaching a replacement metal piece over the damaged portion of the skin. However, in that case, the repair is likely visible and reduces an aerodynamic ability of the part. In other instances, the metal skin may be removed in its entirety and replaced with a new metal sheet, which is expensive and time consuming. There is a need for an improved method and system for repairing cracks at the edge of the metal skin before returning the part to service in a gas turbine engine.

SUMMARY

The present invention relates to a method and system of repairing a part used in a gas turbine engine and having a damaged metal skin bonded to a honeycomb. The damaged metal skin may include a crack originating from an edge of the part. A portion of the honeycomb is removed to form a slot in the honeycomb beginning at an edge of the part. The removed portion of the honeycomb corresponds to a damaged portion of the metal skin. A doubler is inserted into the slot in the honeycomb and is attached to an underside of the metal skin to form a lap joint between the doubler and the metal skin. In one embodiment, the portion of the metal skin that includes the crack remains. In an alternative embodiment, the cracked portion of the metal skin is removed and a metal patch is attached to the doubler such that the patch replaces the removed metal skin. In an exemplary embodiment, the part is a bifurcation panel of a thrust reverser.

It is noted that the drawings are not to scale.

DETAILED DESCRIPTION

A system and method is described herein for repairing or restoring an engine part in which a crack has formed, originating from an edge of the part. The engine part is formed from a honeycomb core sandwiched between two metal skins. The repair includes bonding a metallic doubler to an underside of one of the metal skins in an area surrounding the crack such that the doubler forms a lap joint with the surrounding metal skin. In some embodiments, a patch may be used to replace an area where the cracked metal skin is removed. In that case, the patch is bonded to the doubler and is flush with the remaining portion of the metal skin.

Figure 1:
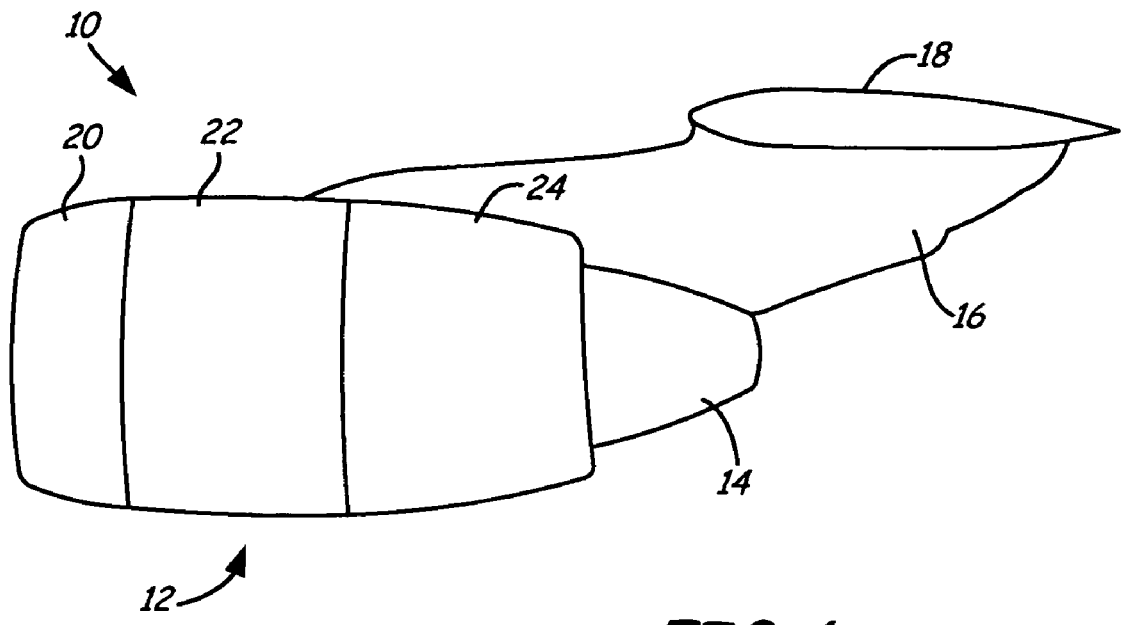
FIG. 1 is a schematic of a nacelle of a gas turbine engine attached to a pylon of an aircraft and including a thrust reverser.

FIG. 1 is a schematic of aircraft 10 including nacelle 12, exhaust nozzle 14, pylon 16 and wing 18. Nacelle 14 functions as an outer casing for a gas turbine engine (not shown), and includes inlet cowl 20, fan cowl 22, and thrust reverser 24. Nacelle 14 is also configured for mounting the gas turbine engine to pylon 16.

Figure 2:
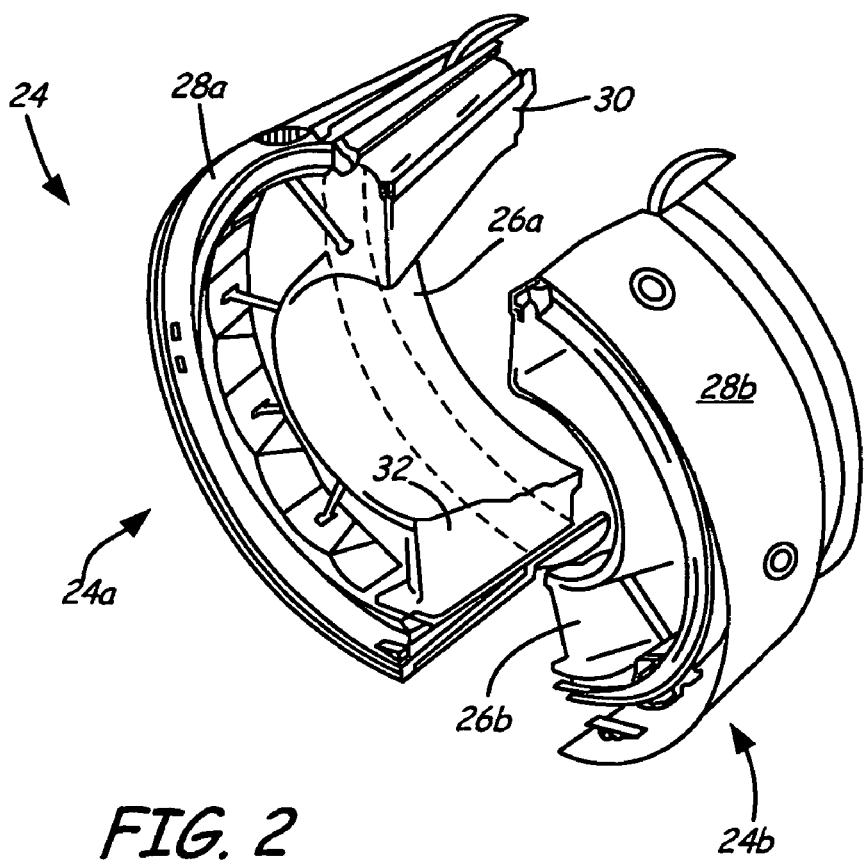
FIG. 2 is a perspective view of the thrust reverser of FIG. 1 in two halves.

FIG. 2 is an expanded perspective view of thrust reverser 24 of FIG. 1 having first half 24a and second half 24b, which are attached to one another to surround the gas turbine engine (not shown). Each half 24a and 24b includes inner cowl 26a and 26b (also known as the core cowl) and outer cowl 28a and 28b. Thrust reverser 24 is configured such that outer cowl 28 slides in an aft direction, and air flowing through thrust reverser 24 is directed forwardly to aid in deceleration during landing of aircraft 10. Inner cowl 26a and outer cowl 28a are attached to one another, in part, by bifurcation panels 30 and 32. Although not visible in FIG. 2, second half 24b also includes two bifurcation panels.

Figure 3:
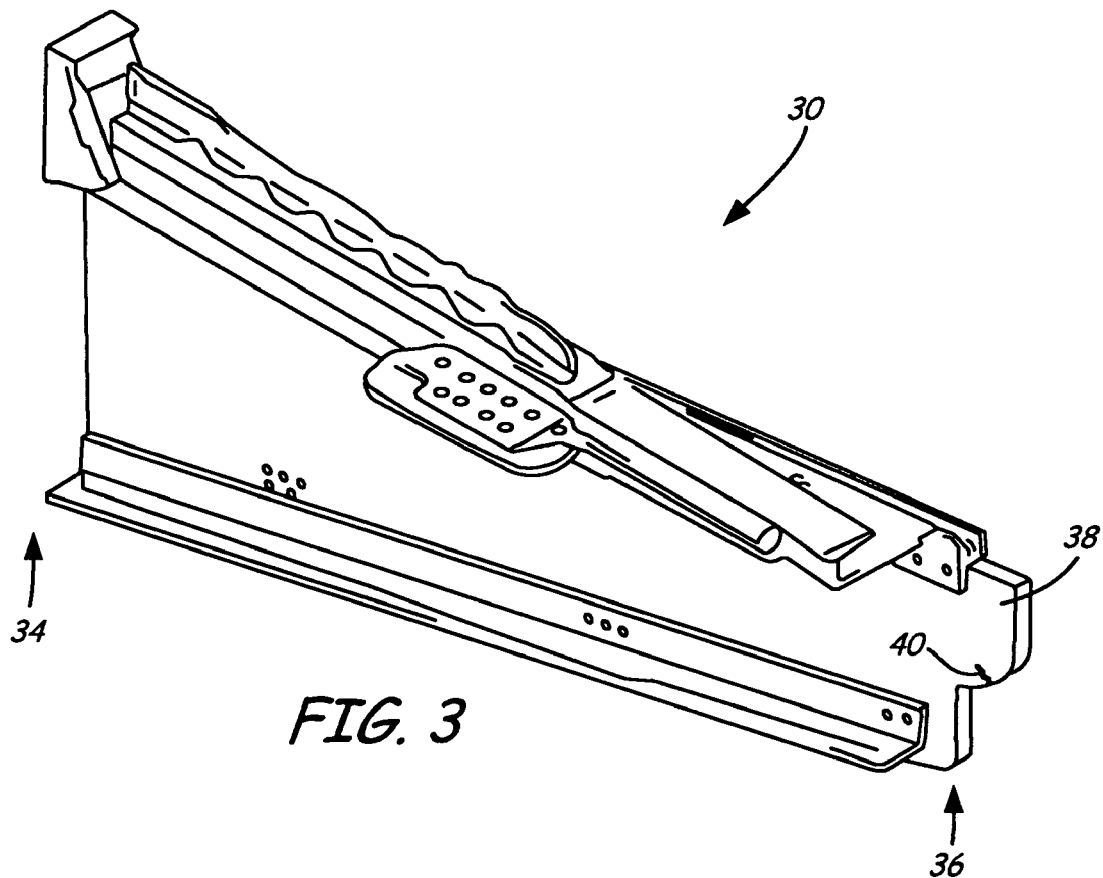
FIG. 3 is a perspective view of a bifurcation panel of the thrust reverser of FIG. 2, which includes a crack at one end of the panel.

FIG. 3 is a perspective view of bifurcation panel 30 of FIG. 2. Panel 30 includes first end 34 and second end 36 having curved portion 38, which includes crack 40. Panel 30 may be prone to developing cracks that start at an edge of panel 30, particularly in areas of concentrated stress, such as curved portion 38. As described further below, crack 40 may be repaired using a metallic doubler. The bifurcation panel of the thrust reverser is one example of a gas turbine engine part that may develop cracks at the edge of the part. It is recognized that the system and method described herein may apply to other engine parts.

Figure 4:
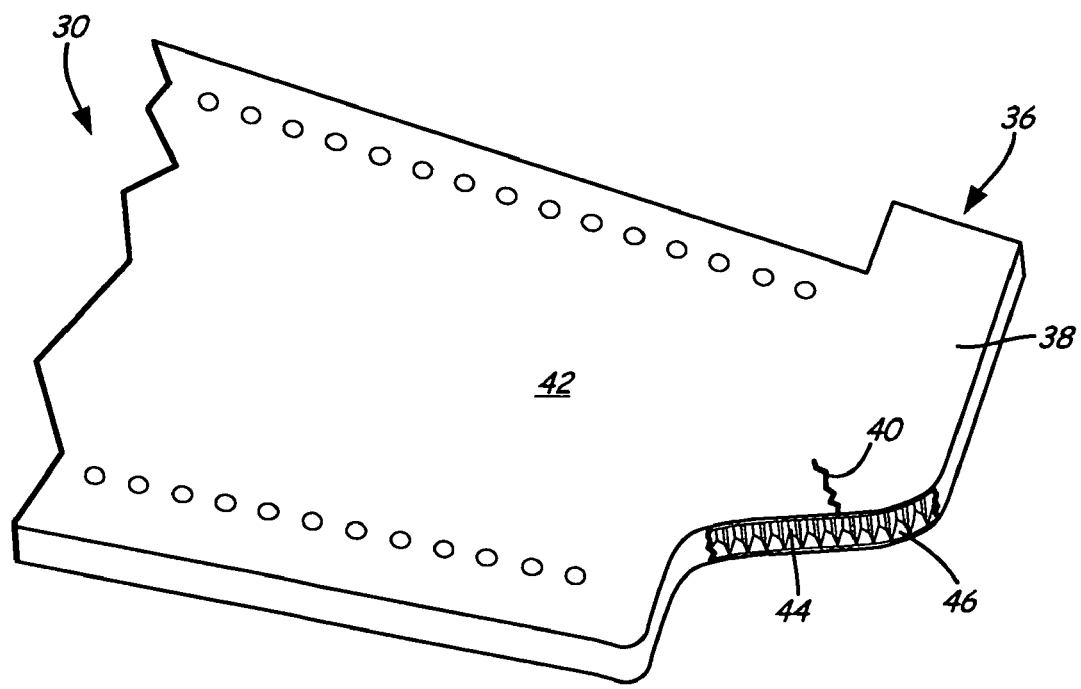
FIG. 4 is a perspective view of a portion of the bifurcation panel of FIG. 3, which includes a perforated face skin, a honeycomb core, and a back skin having a crack.

FIG. 4 is a perspective view of a portion of panel 30, including curved portion 38, to illustrate the components of panel 30, as well as a formation of crack 40. Panel 30 is made up of back skin 42, honeycomb core 44, and face skin 46. Back skin 42 is commonly a non-perforated metal sheet. Face skin 46 may also be a metal sheet, but typically includes a plurality of perforations (not shown) that extend through the skin. In an exemplary embodiment, back skin 42 and face skin 46 are aluminum; however, it is recognized that other metals, such as, for example, titanium, may be used to form back skin 42 and face skin 46. Honeycomb core 44 may be adhesively bonded to back skin 42 and face skin 46, and is commonly formed from metal, such as, for example, aluminum or titanium. Honeycomb core 44 may also be made from a non-metallic material, such as, for example, an aromatic polyamide like Nomex® honeycomb from Dupont.

As shown in FIG. 4, crack 40 formed in curved portion 38 at second end 36 of panel 30. Cracks similar to crack 40 may form in either back skin 42 and/or face skin 46 in other locations on panel 30. Crack 40 may cause back skin 42 to release away from honeycomb 44. Crack 40 is repaired in order to maintain structural integrity of panel 30 and operational efficiency of thrust reverser 24. Moreover, repairing crack 40 after it is first noticed prevents crack 40 from becoming larger, which may lead to further separation of back skin 42 from honeycomb 44, and eventually lead to damage of honeycomb 44.

In previously used methods, depending on a size of a crack, panel 30 may be repaired by removing back skin 42 entirely from panel 30 and attaching a replacement back skin to honeycomb core 44. This method is not only expensive, but also time consuming. In another previously used method, a piece of metal may be attached to back skin 42 to cover the crack. However, in that case, the metal piece may extend above the surface of back skin 42. Fasteners used to attach the metal piece to skin 42 may also extend above the surface. Another disadvantage is the metal piece is visible after the repair is completed, thus affecting the cosmetics of the finished product. More importantly, for aerodynamic surfaces, the metal piece and fasteners may cause a disruption in the airflow across the surface.

As described herein, the method and system of repairing panel 30 with a metal doubler bonded to an underside of the metal skin is an improvement over existing designs. Benefits of the present invention, as compared to existing designs, include, but are not limited to, cost savings, less time to complete the repair, and improved structural integrity. In an embodiment described and shown below in FIGS. 6-10, a portion of back skin 42 that includes crack 40 may be removed from panel 30. The removed area of back skin 42 may then be replaced with a patch that is flush with the remaining area of the back skin. In another embodiment described and shown below in FIGS. 11-12, crack 140, which has formed in back skin 42, is not removed as part of the repair method.

Figure 5:
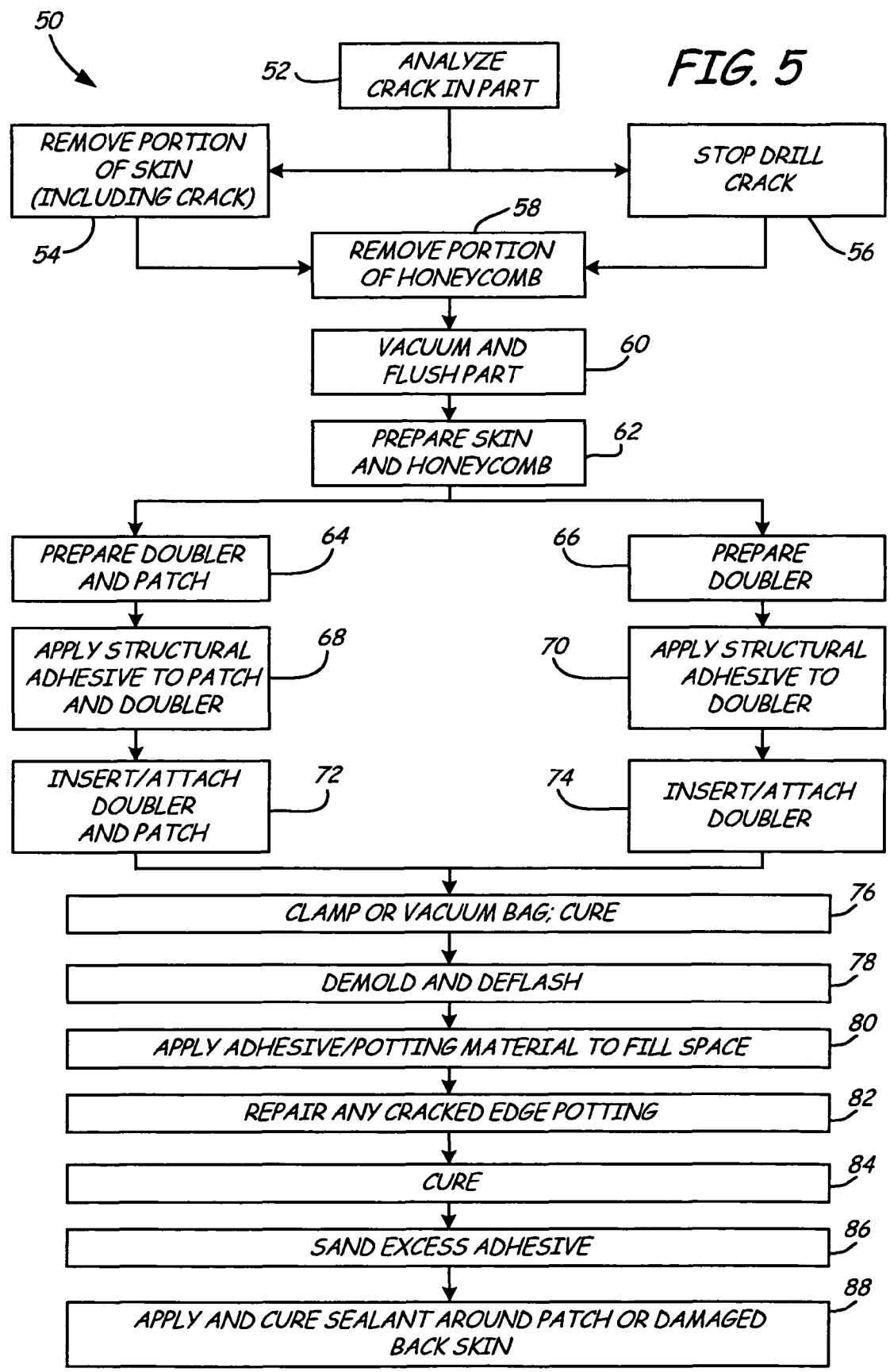
FIG. 5 is a block diagram illustrating a method of repairing or restoring the damaged back skin of the bifurcation panel.

FIG. 5 is a block diagram illustrating method 50 of repairing a crack, like crack 40 of FIGS. 3 and 4, which forms at an edge of a part having a metal skin and honeycomb core. Method 50 includes steps 52 through 88 and begins with analyzing the crack (step 52) to determine if the area of the back skin including and immediately surrounding the crack should remain or if it should be removed and replaced. The analysis may include, but is not limited to, assessing the size of the crack and whether a portion of the back skin has started to lift away from the surface of the part. In an exemplary embodiment, if the crack is greater than approximately 0.5 inches, in most cases, a portion of the back skin is removed.

Figure 6:
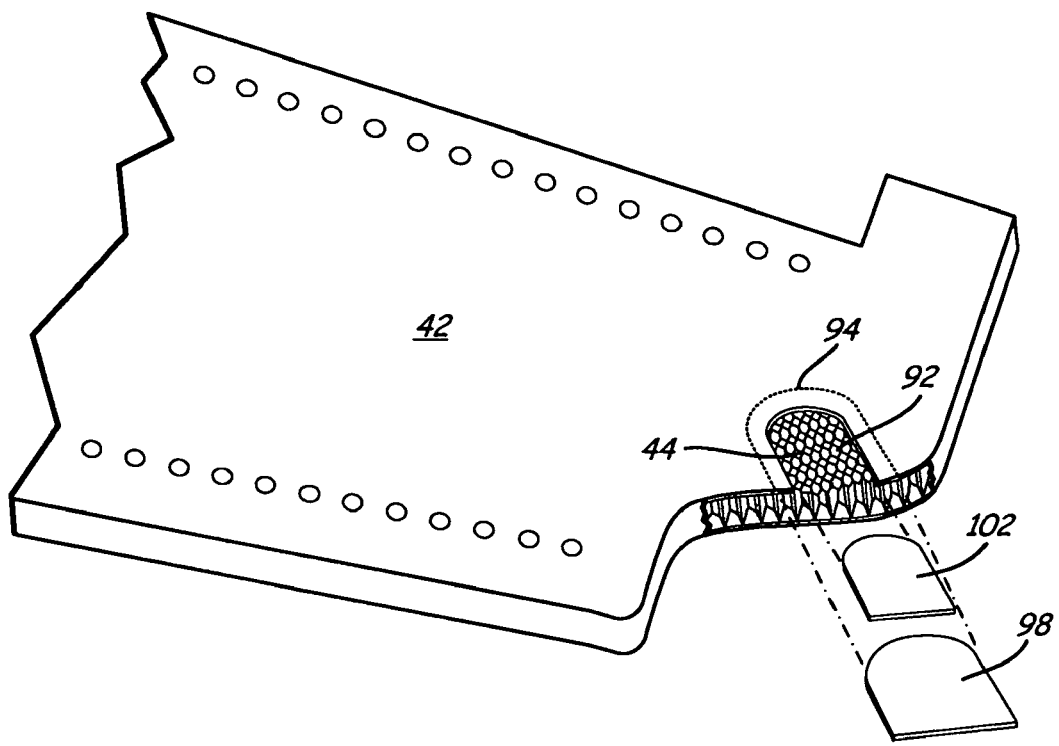
FIG. 6 is a perspective view of the panel of FIG. 4 illustrating the method of repairing the crack in the back skin.

A next step in method 50 depends on the analysis of the crack in step 52. Step 54 is to remove a portion of the back skin that includes the crack by cutting out a portion of the back skin. FIG. 6 shows an example of how much of the back skin is removed relative to the crack. Alternatively, in step 56, the back skin remains as part of the repair and the crack is stop drilled using, for example, a ¼" drill bit. (See FIG. 11.) This is done to reduce stress concentration at the end of the crack. In step 56, caution should be used so that the underlying honeycomb core is not damaged beyond a depth of the honeycomb core to be removed in step 58.

Figure 7:
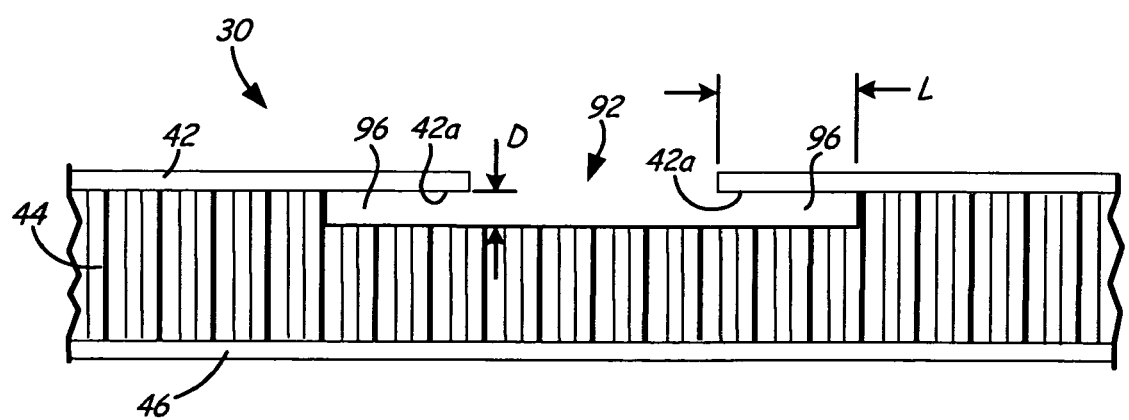
FIGS. 7-10 are cross-sectional views of the back skin, honeycomb core, and the perforated skin during steps in the repair of the back skin.

Regardless of whether step 54 or step 56 is performed, a next step is to remove a portion of the honeycomb core (step 58). In the embodiment in which step 54 is performed, the honeycomb is undercut relative to the removed back skin such that the back skin has an overlap of approximately one inch, relative to the remaining honeycomb. This is illustrated in FIG. 7 below. The honeycomb may be removed by mechanically creating a slot in the honeycomb. The slot may be formed, for example, using a cut-off wheel or a reciprocating saw. The honeycomb may be removed from the side of the part. Alternatively, the honeycomb may be removed starting from above the back skin. In an embodiment in which the cracked area of the back skin is to remain (step 56), in step 58, the crack may be widened such that a cut-off wheel may be inserted through the crack and then used to remove an appropriate amount of the honeycomb. The slot created by the removed area of the honeycomb is configured for receiving a doubler that is bonded to an underside of the back skin, as described further below in reference to steps 72 and 74.

After removing a portion of the honeycomb, the part is vacuumed to remove any dust and debris (step 60). The slot and the surrounding area are also flushed out using a cleaning agent. The back skin and honeycomb are then prepared in step 62 for bonding with a metal piece. Step 62 includes treating the back skin and the honeycomb, and then applying a primer to exposed areas of the honeycomb and to an underside of the back skin. In an exemplary embodiment, the primer may be an epoxy with a corrosion inhibitor. Complete coverage of the primer on these surfaces is important. The primer is then flashed to remove solvents and then cured.

A next step in method 50 is either step 64 or step 66, and again depends on whether step 54 or 56 is performed. In either case, a metal doubler is prepared for insertion into the slot formed in the honeycomb. A difference between steps 64 and 66 is whether a patch is also prepared as part of method 50. If a portion of the back skin is removed in step 54, then under step 64, a doubler and a patch are prepared. Alternatively, if the cracked portion of the back skin remains (step 56), then step 66 is followed and only a doubler is prepared.

In both steps 64 and 66, preparation of the doubler includes manufacturing a metal sheet. In preferred embodiments, the metal doubler is formed from the same material as the back skin. In the exemplary embodiment described herein, the doubler is an aluminum sheet having a thickness of approximately 0.025 inches. In step 64, a length and width of the doubler are based on how much of an area of the back skin is removed in step 54. A metal patch is also manufactured with the doubler in step 64. The patch is sized to be approximately equal to an area of the back skin removed in step 54. The doubler is larger than the patch since the honeycomb is undercut in step 58 in order to create a lap joint between the doubler and an underside of the back skin. This is described further below. In step 66, the size of the doubler depends on a size of the crack. The doubler is large enough so it bonds with an underside of an undamaged portion of the back skin, as described further below in reference to FIGS. 11 and 12. The primer used on the back skin and the honeycomb in step 62 is also applied to the doubler and the patch in steps 64 and 66. The primer is applied completely to one side of the doubler and completely to one side of the patch. The primer is then flashed and cured.

In steps 68 and 70, a structural adhesive is applied to the doubler for bonding the doubler to an underside of the back skin. In step 68, the structural adhesive is also applied to the patch for bonding the patch to the doubler. The adhesive in steps 68 and 70 may include, but is not limited to, an epoxy adhesive. In an exemplary embodiment, the epoxy adhesive is aluminum-filled. In some embodiments, the adhesive may be scrim supported to make the adhesive easier to handle and to control flow of the adhesive prior to curing.

In step 72, the doubler and the patch are inserted and attached to the part. In a preferred embodiment, step 72 is performed in two sequences. First, the doubler, which includes the adhesive, is inserted into the slotted honeycomb, starting at the edge of the part. The doubler is then attached to the underside of the back skin surrounding the removed area to form a lap joint with the back skin. Second, the patch is then attached to the exposed portion of the doubler, which corresponds to the removed portion of the back skin. The patch is configured to be flush with a remaining portion of the back skin. Alternatively, in step 74, the doubler is inserted into the slot formed in the honeycomb and the doubler is attached, using the adhesive, to the cracked area of the back skin and the surrounding area. In both steps 72 and 74, shims or supports may be used to ensure that pressure is applied to the lap joint between the doubler and the back skin.

Next, in step 76, the part is clamped and/or vacuum bagged to ensure at least 10 psi mechanical pressure (22 in Hg vacuum pressure). The adhesive is then cured. The vacuum bag, clamps and other related materials are then removed from the part. Any excess adhesive is removed by demold and deflash in step 78. A tap test or other non-destructive inspection test may be performed to ensure that no areas of unbond exist.

Figure 10:
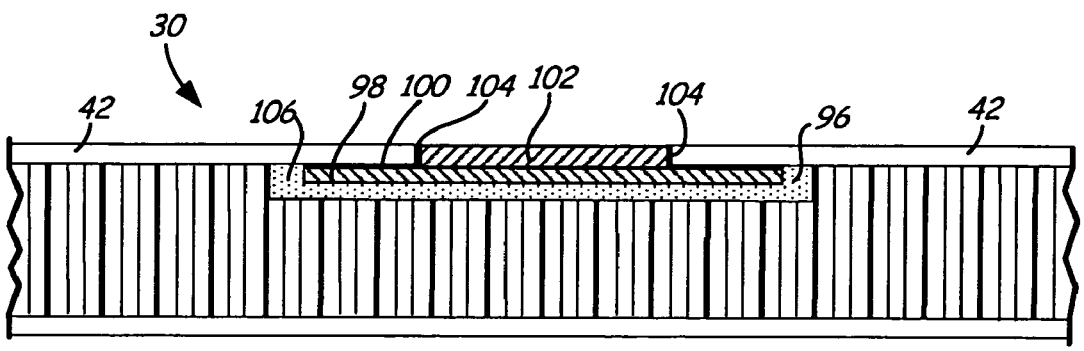

Adhesive or potting material is then applied to any open space between the doubler and the honeycomb (step 80), as shown in FIG. 10 below. The space between the doubler and the honeycomb may be filled with the adhesive by inserting the adhesive from the edge of the part. In step 82, any cracked edge potting that was damaged may be repaired by filling it with adhesive or potting material. In steps 80 and 82, the adhesive functions primarily as a potting material for filling a space, as opposed to functioning as a bonding material. The adhesive potting from steps 80 and 82 is then cured (step 84). In step 86, any excess adhesive is sanded flush to adjacent surfaces.

A final step (step 88) in method 50 is to apply an adhesive sealant around the patch and the surrounding back skin or to the cracked portion of the back skin. The adhesive sealant is used, in part, to seal any gaps remaining on the surface. In an exemplary embodiment, the adhesive sealant may be an epoxy adhesive. Step 88 also includes removing any excess sealant from the surface and then curing the sealant. In some embodiments, curing of the adhesive sealant may be a room temperature cure.

FIGS. 6 through 12 illustrate the steps of repair method 50 on panel 30 of FIGS. 3 and 4. In one embodiment shown in FIGS. 6 through 10, the repair includes removal of the portion of back skin 42 having crack 40. The removed back skin is then replaced with a patch. In another embodiment shown in FIGS. 11 and 12, panel 30 includes crack 140 in back skin 42 and the cracked portion of back skin 42 remains as part of the repair.

FIG. 6 is a perspective view of panel 30 from FIG. 4 after the repair or restoration process for back skin 42 is already underway. Doubler 98 and patch 102 are also shown in FIG. 6. A portion of back skin 42 has already been removed from panel 30, and this area is labeled as area 92 in FIG. 6. Due to removal of back skin 42, underlying honeycomb 44 is visible in area 92. A shape of patch 102 is generally similar to removed area 92. Some of honeycomb 44 has already been removed from panel 30 in FIG. 6 to form a slot (see slot 96 in FIG. 7) for receiving doubler 98. The removed area of honeycomb 44 is designated by dashed line 94. Doubler 98 has a shape generally similar to the area represented by dashed line 94. As shown in FIG. 6, the removed area of honeycomb 44 is larger than the removed area 92 of back skin 42.

FIG. 7 is a cross sectional view of panel 30 taken near an edge of curved portion 38. Panel 30 includes back skin 42, honeycomb 44, face skin 46, slot 96 and removed area 92 of back skin 42. The remaining portion of back skin 42 includes underside 42a. In an exemplary embodiment, a depth D of slot 96 is between approximately 0.044 and 0.125 inches (approximately 1.12 and 3.18 millimeters). A length of slot 96 depends on removed area 92 of back skin 42 since a remaining portion of back skin 42 overlaps slot 96. In an exemplary embodiment, a length L of the overlap is between approximately 1.0 and 2.0 inches (approximately 2.54 and 5.08 centimeters). In preferred embodiments, length L is greater than 1.0 inch (2.54 centimeters).

Figure 8:
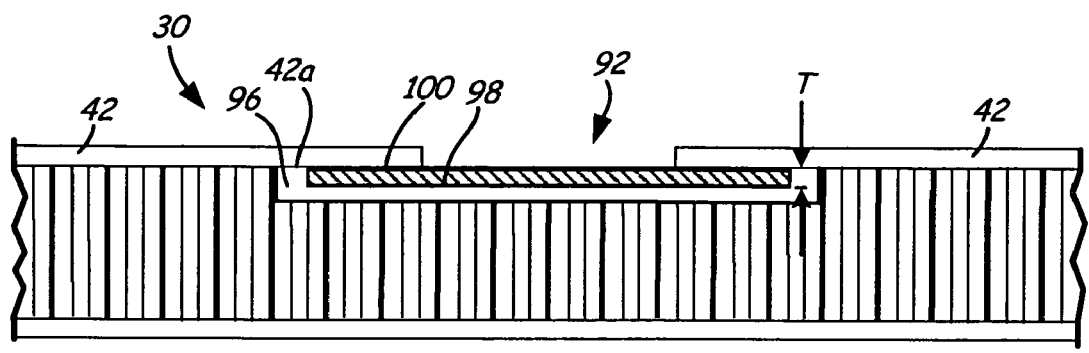

FIG. 8 shows panel 30 after doubler 98 has been attached to panel 30 in slot 96. As described above, doubler 98 is typically formed from the same material as back skin 42. In an exemplary embodiment, doubler 98 is an aluminum sheet having a thickness T of approximately 0.025 inches. It is recognized that doubler 98 may be formed from other metals. In preferred embodiments, back skin 42 and doubler 98 are formed from the same metal, but this is not required.

Adhesive layer 100 is used to attach doubler 98 to underside 42a of the remaining portion of back skin 42. As described above under method 50, adhesive layer 100 may be applied to one side of doubler 98 prior to inserting doubler 98 into slot 96. Doubler 98 having adhesive layer 100 may then be inserted into slot 96 starting from an open edge of panel 30. An outer circumference of doubler 98 is attached to a remaining portion of back skin 42 surrounding removed area 92. As shown in FIG. 8, doubler 98 forms a lap joint with back skin 42, thus resulting in a high strength bond between doubler 98 and back skin 42.

Figure 9:
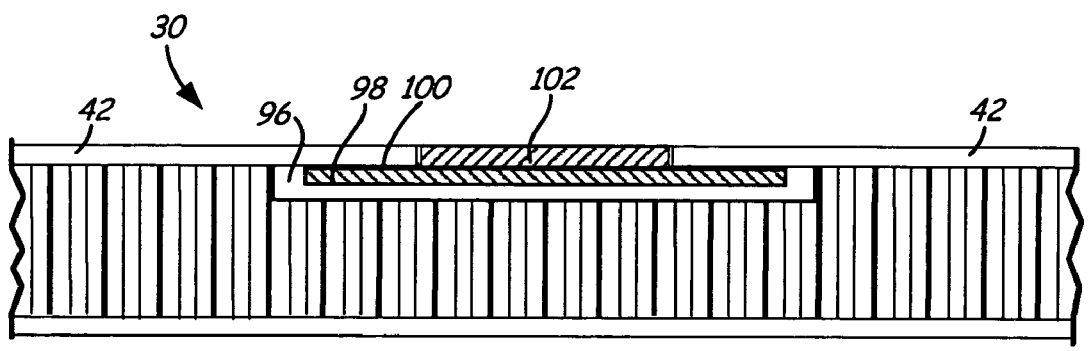

FIG. 9 shows panel 30 after patch 102 has been attached to panel 30. Patch 102 may be formed from the same metal sheet used to form doubler 98. In a preferred embodiment, the area of patch 102 is slightly smaller than the removed area 92, so that patch 102 is easily attached in removed area 92. Before attaching patch 102, an adhesive that is the same as adhesive 100 of FIG. 8 may be applied to an underside of patch 102. The adhesive coated side of patch 102 is then attached to an exposed portion of doubler 98 having adhesive 100. After attaching doubler 98 and patch 102, adhesive 100 may be cured, as described above in reference to FIG. 5.

Adhesive 100 is used to attach doubler 98 to an underside 42a of back skin 42 and to attach patch 102 to doubler 98. Thus, adhesive 100 is a structural adhesive that is able to carry and distribute load across panel 30. A suitable material for adhesive 100 is an epoxy paste adhesive, which may, in an exemplary embodiment, be aluminum filled. An epoxy adhesive is well suited for use in this application given its high tensile strength and high temperature resistance. In some embodiments, adhesive 100 may be carried by a scrim support, such as bond line netting. Other suitable adhesives include, but are not limited to, a bismaleimide (BMI) paste adhesive and a film adhesive formed of epoxy or BMI. The selected adhesive may be restricted to those adhesives that cure sufficiently at temperatures that will not degrade the pre-existing components, including previously cured adhesives and potting materials, metallic or non-metallic skins, and honeycomb cores.

As shown in FIG. 9, slot 96 is typically larger in area than doubler 98. An adhesive or potting material is used to fill any space in slot 96. FIG. 9 also shows that a gap or a channel may exist between patch 102 and surrounding back skin 42. An adhesive sealant may be used to fill space in the gap surrounding patch 102. FIG. 10 shows adhesive 106 in the remaining area of slot 96. Adhesive 106 may be injected into slot 96 from the open edge of the part. In one embodiment, adhesive 106 may be an epoxy adhesive. In alternative embodiments, adhesive 106 may include other types of adhesives or a potting compound, such as, but not limited to, a BMI or epoxy syntactic potting material, or an expanding epoxy foam. Adhesive 106 is preferably a lightweight material intended to fill the remaining space within slot 96. A second curing process may then be performed to cure adhesive 106.

Adhesive or sealant layer 104 is also shown in FIG. 10 in the gap between patch 102 and the remaining portion of back skin 42. Sealant layer 104 is usually applied as, or close to, a final step in the repair. In one embodiment, sealant layer 104 is applied after adhesive 106 is cured. Sealant 104 is used primarily to fill any gaps between patch 102 and remaining back skin 42 on an air flow surface. In an exemplary embodiment, sealant 104 may also be an epoxy adhesive. However, it is not required that sealant 104 provide a structural bond between patch 102 and back skin 42, but rather that sealant 104 fills any space and creates a smooth surface across panel 30. Other suitable materials for sealant 104 include, but are not limited to, BMI, as well as more compliant materials such as polysulfides, silicone rubber and fluorocarbon elastomers.

In the embodiment shown in FIGS. 8-10, doubler 98 provides structural strength to panel 30 by reinforcing back skin 42. Patch 102 is used primarily to fill a space created by the removal of back skin 42 and maintain an aerodynamic surface on panel 30. A benefit of doubler 98 is that it is bonded to an underside of back skin 42, and therefore does not impact the aerodynamics of panel 30. The lap joint between doubler 98 and back skin 42 provides a sufficiently strong bond to withstand the operating conditions that panel 30 is exposed to.

Figure 11:
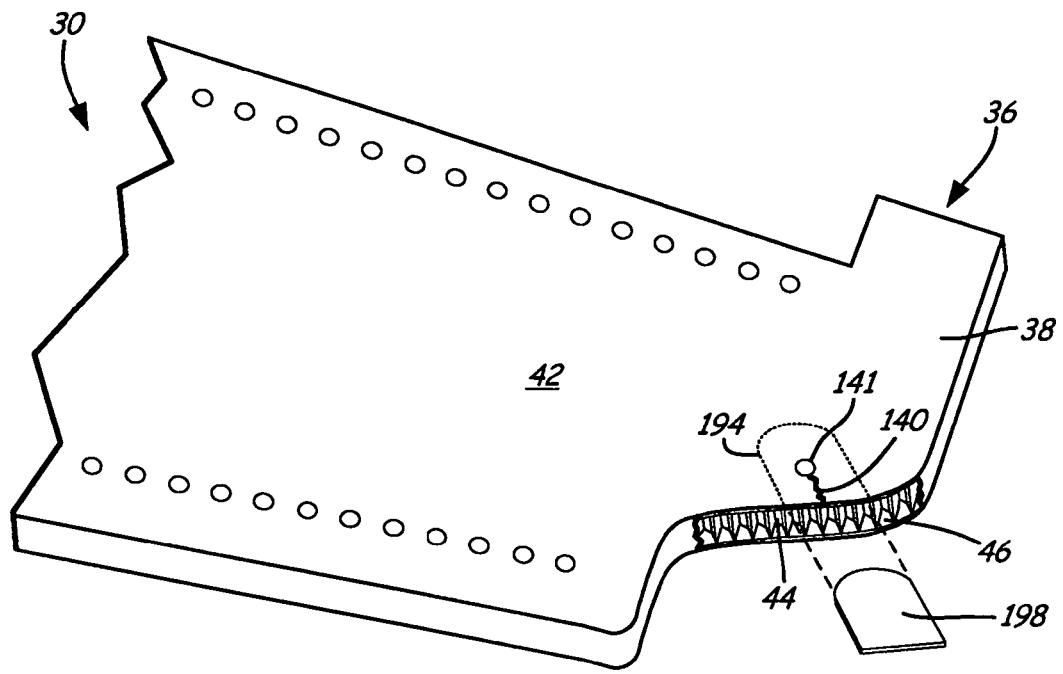
FIG. 11 is a perspective view of the panel of FIG. 4 illustrating an alternative embodiment for repairing a crack in the back skin.
Figure 12:
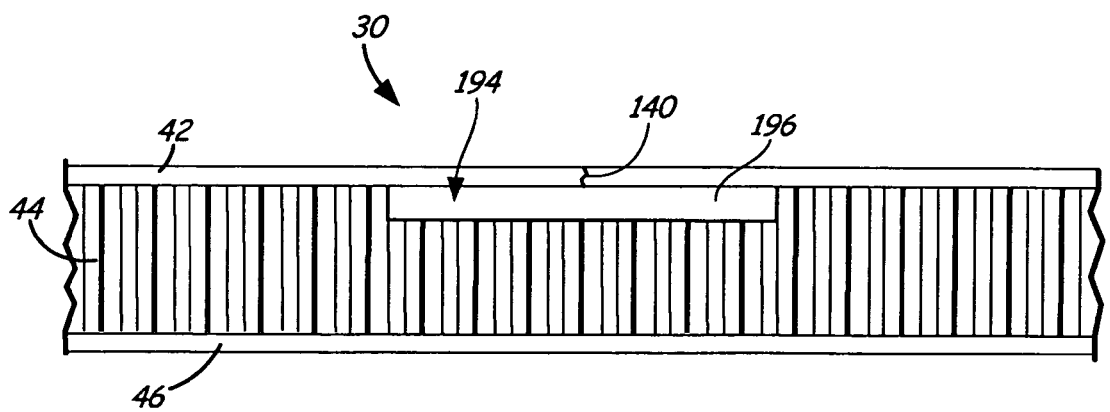
FIG. 12 is a cross-sectional view of the panel from FIG. 11 showing a slot formed in the honeycomb core as part of the repair.

In an embodiment shown in FIGS. 11 and 12, the cracked or damaged portion of the back skin remains and a doubler is used to restore the back skin. FIG. 11 is a perspective view of panel 30 having crack 140. With an exception of crack 140, the other components of panel 30 of FIG. 11 are the same as those shown in FIGS. 3 and 4 and described above. In the exemplary embodiment shown in FIG. 11, crack 140 is smaller than crack 40 of FIGS. 3 and 4.

FIG. 11 shows panel 30 after stop drill 141 has already been drilled at an end of crack 140. Stop drill 141 may be formed using a drill bit and is created in order to reduce a stress concentration at the end of crack 140. Doubler 198 is also shown in FIG. 11 and is configured for insertion into a slot created by removing a portion of honeycomb 44. The removed area of honeycomb 44 is designated by dashed line 194. In order to create a lap joint of sufficient strength, area 194 is larger than an area of crack 140 and stop drill 141. This is done so that an undamaged portion of back skin 42 surrounding crack 140 is bonded to doubler 198.

FIG. 12 is a cross sectional view of panel 30 of FIG. 11 taken near an edge of curved portion 38. Panel 30 of FIG. 12 includes back skin 42, honeycomb 44, face skin 46 and crack 140 in back skin 42. Slot 196 is created by removing a portion of honeycomb 44 and corresponds with area 194 shown in FIG. 11. Slot 196 is configured to receive doubler 198 (not shown in FIG. 12), which is then bonded to an underside of back skin 42 surrounding crack 140.

As similarly described above in reference to FIGS. 9 and 10, after doubler 198 is attached to back skin 42, an adhesive or potting material, like adhesive 106 of FIG. 10, may be inserted from an edge of panel 30 to fill any remaining space in slot 196. An adhesive or sealant layer, similar to sealant layer 104 of FIG. 10, may also be applied onto back skin 42 in crack 140 to fill any gaps in back skin 42 and create a smooth airflow surface.

In the exemplary embodiments described herein and shown in FIGS. 3-4 and 6-12, cracks 40 and 140 formed on a non-acoustic side (back skin 42) of panel 30. It is recognized that a similar crack may form on an acoustic side (face skin 46) of panel 30. Face skin 46 commonly is a perforated skin which contains a plurality of perforations for acoustics. The repair method and system described herein may also be used on the acoustic side of panel 30, and in an acoustic area of other engine parts. Holes in the perforated skin may become blocked with the filler adhesive (adhesive 104) that is applied to the skin near the end of the repair process. As such, before performing a repair to an acoustic side of a part, it may be necessary to determine an acoustic loss that is acceptable for that particular part. For example, a higher amount of acoustic loss may be acceptable for a fan case, as compared to the thrust reverser shown and described above. The acceptable acoustic loss is determined as a percentage of the total area of the part. To protect a certain percentage of the holes from becoming blocked with adhesive, tape may be placed over some of the holes surrounding the repair area. An amount of the area that is taped off may be determined based on the acceptable acoustic loss.

Although the repair is described herein in the context of a cracked thrust reverser panel, it is recognized that the system and method of the present invention may be used on any engine part in which a crack forms at an edge of a metal skin. As an example, a fan case may experience similar cracking.

Although the present invention has been described with reference to preferred embodiments, workers skilled in the art will recognize that changes may be made in form and detail without departing from the spirit and scope of the invention.

The invention claimed is:

1. A method of repairing a part used in a gas turbine engine and having a damaged metal skin bonded to a honeycomb, the method comprising:
    removing a portion of the honeycomb to form a slot in the honeycomb beginning at an edge of the part, wherein the removed portion of the honeycomb corresponds to a damaged portion of the metal skin;
    inserting a metal doubler into the slot;
    attaching the metal doubler to an underside of the metal skin to form a lap joint between the metal doubler and the metal skin.

2. The method of claim 1 further comprising:
    removing the damaged portion of the metal skin prior to inserting the metal doubler into the slot.

3. The method of claim 2 wherein the removed portion of the metal skin is smaller than the removed portion of the honeycomb.

4. The method of claim 2 further comprising:
    attaching a patch to a portion of the metal doubler such that the patch replaces the removed portion of the metal skin.

5. The method of claim 4 wherein the patch is flush with a remaining portion of the metal skin.

6. The method of claim 1 wherein attaching the metal doubler to the underside of the metal skin is performed by a structural adhesive.

7. The method of claim 1 wherein the slot is larger than the metal doubler and the method further comprises:
    applying at least one of an adhesive and a potting material to fill any space between the metal doubler and the honeycomb, after attaching the metal doubler to the underside of the metal skin.

8. The method of claim 1 further comprising:
applying a sealant to the metal skin to fill any space between the skin and the metal doubler.

9. The method of claim 1 wherein the damaged metal skin includes a crack in the metal skin originating from an edge of the part and the method further comprises:
drilling a hole at an end of the crack in the metal skin, prior to removing a portion of the honeycomb.

10. A method of repairing an end portion of a part used in a gas turbine engine and having a honeycomb bonded to an underside of a metal skin, the method comprising:
removing a damaged area of the metal skin at the end portion of the part;
removing an area of the honeycomb that corresponds to the damaged area of the metal skin and is larger than the removed area of the metal skin;
inserting a doubler into the removed area of the honeycomb; and
attaching the doubler to the underside of a remaining area of the metal skin.

11. The method of claim 10 wherein attaching the doubler to the underside of the metal skin is performed by a structural adhesive.

12. The method of claim 11 further comprising:
attaching a patch to the doubler such that the patch corresponds with the removed area of the metal skin and is flush with the remaining area of the metal skin.

13. The method of claim 12 wherein a structural adhesive is used to attach the patch to the doubler.

14. The method of claim 10 further comprising:
inserting at least one of an adhesive and a potting material into a space between the doubler and the honeycomb, after attaching the doubler to the underside of the metal skin.

15. The method of claim 10 wherein the doubler is a metal sheet.

16. The method of claim 10 wherein the engine part is a panel in a thrust reverser of a gas turbine engine.

17. A repaired part used in a gas turbine engine, the part comprising:
a honeycomb having a first side and a second side;
a first skin having an underside bonded to the first side of the honeycomb;
a second skin having an underside bonded to the second side of the honeycomb;
a repair section comprising:
a metal doubler attached to a portion of the underside of the first skin to form a lap joint with the first skin; and
an adhesive that occupies a space between the doubler and a portion of the honeycomb.

18. The repaired part of claim 17 wherein the repair section further comprises:
a metal patch attached to the doubler such that the patch is flush with a surrounding area of the first skin.

19. The repaired part of claim 17 wherein the first skin is a back skin and the second skin is a perforated skin.

20. The repaired part of claim 17 wherein the part is a panel in a thrust reverser.

* * * * *